United States Patent
Meacham et al.

(10) Patent No.: US 9,501,796 B2
(45) Date of Patent: Nov. 22, 2016

(54) DATASET INTERSECTION DETERMINATION

(71) Applicant: Chicago Mercantile Exchange Inc., Chicago, IL (US)

(72) Inventors: Paul Meacham, Tinley Park, IL (US); Jacques Doornebos, Riverside, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 528 days.

(21) Appl. No.: 14/030,377

(22) Filed: Sep. 18, 2013

(65) Prior Publication Data
US 2015/0081622 A1    Mar. 19, 2015

(51) Int. Cl.
*G06F 17/30*    (2006.01)
*G06Q 40/04*    (2012.01)
*G06F 12/08*    (2016.01)

(52) U.S. Cl.
CPC .......... *G06Q 40/04* (2013.01); *G06F 12/0868* (2013.01); *G06F 17/30312* (2013.01); *G06F 12/0897* (2013.01); *G06F 17/3033* (2013.01); *G06F 2212/1016* (2013.01); *G06F 2212/465* (2013.01)

(58) Field of Classification Search
CPC ................... G11C 7/1072; G06Q 40/04; G06F 12/0246; G06F 12/0811; G06F 2212/1016; G06F 2212/1041; G06F 2212/283; G06F 17/30312; G06F 17/3033; G06F 2212/465; G06F 12/0897; G06F 12/0868; G06F 12/08; G06F 17/30

USPC .................................................. 707/752, 607
See application file for complete search history.

(56) References Cited

U.S. PATENT DOCUMENTS

| | | | |
|---|---|---|---|
| 4,774,654 A |  | 9/1988 | Pomerene et al. |
| 5,377,154 A | * | 12/1994 | Takasugi ............. G11C 7/1018 365/189.04 |
| 5,644,787 A | * | 7/1997 | Nakamura ............ G06F 3/0601 710/3 |

(Continued)

FOREIGN PATENT DOCUMENTS

WO    WO2007147681 A2    12/2007

OTHER PUBLICATIONS

Ronny Meir—"Bias, Variance and the Combination of Least Squares Estimators"—Faculty of Electrical Engineering Technion, Haifa 32000 Israel Advances in neural information processing systems, 1995—books.google.com—pp. 295-302.*

(Continued)

*Primary Examiner* — Anh Ly
(74) *Attorney, Agent, or Firm* — Lempia Summerfield Katz LLC

(57) ABSTRACT

An item is determined to exist in a dataset by arranging the dataset into a plurality of subsets, each bounded by the minimum amount of memory that may be transferred between levels of memory in a memory configuration. The item and the subsets have attributes that allow for a determination of which subset the item would exist in if the item were in the dataset. A singular subset is transferred between levels of memory to determine whether the item exists in the transferred subset. If the item does not exist in the transferred subset, it is determined that the item does not exist in the dataset.

21 Claims, 4 Drawing Sheets

(56) References Cited

U.S. PATENT DOCUMENTS

| | | | | |
|---|---|---|---|---|
| 6,556,200 | B1* | 4/2003 | Pfister | G06T 15/55 345/426 |
| 8,229,838 | B2* | 7/2012 | Milne | G06Q 40/06 705/36 R |
| 8,380,737 | B2 | 2/2013 | Balkesen et al. | |
| 8,433,702 | B1* | 4/2013 | Carrino | G06F 17/30964 707/717 |
| 8,612,321 | B2* | 12/2013 | Tully | G06Q 40/00 705/35 |
| 2003/0031319 | A1* | 2/2003 | Abe | G11B 20/00086 380/232 |
| 2003/0088740 | A1* | 5/2003 | Henry | G06F 9/30047 711/137 |
| 2003/0204698 | A1* | 10/2003 | Sachedina | G06F 12/0806 711/170 |
| 2005/0283369 | A1* | 12/2005 | Clausner | G06F 17/30722 707/E17.095 |
| 2006/0271526 | A1* | 11/2006 | Charnock | G06Q 30/02 707/E17.109 |
| 2008/0104375 | A1* | 5/2008 | Hansen | G06F 9/30018 712/220 |
| 2008/0189512 | A1* | 8/2008 | Hansen | G06F 9/30014 712/1 |
| 2008/0301256 | A1* | 12/2008 | McWilliams | G06F 12/0284 709/214 |
| 2009/0039163 | A1* | 2/2009 | Longacre, Jr. | G06K 7/10544 235/462.25 |
| 2009/0269772 | A1* | 10/2009 | Califano | G01N 33/5008 707/E17.014 |
| 2009/0287685 | A1* | 11/2009 | Charnock | G06F 17/30722 707/E17.109 |
| 2010/0169340 | A1* | 7/2010 | Kenedy | G06Q 30/0631 707/758 |
| 2010/0169343 | A1* | 7/2010 | Kenedy | G06F 17/30867 707/758 |
| 2011/0055067 | A1* | 3/2011 | Milne | G06Q 40/04 705/37 |
| 2011/0236903 | A1* | 9/2011 | McClelland | C12Q 1/6886 702/19 |
| 2011/0258575 | A1* | 10/2011 | Cupp | G06F 3/0485 715/784 |
| 2012/0131265 | A1* | 5/2012 | Koltsidas | G06F 12/0868 711/103 |
| 2012/0278333 | A1 | 11/2012 | Ramachandran et al. | |
| 2013/0173863 | A1 | 7/2013 | Heil et al. | |
| 2013/0290611 | A1* | 10/2013 | Biederman | G11C 16/30 711/103 |
| 2016/0173901 | A1* | 6/2016 | He | H04N 19/463 375/240.25 |

OTHER PUBLICATIONS

Iztok Savnik—"Algorithm for Matching Sets of Time Series"—Chapter Principles of Data Mining and Knowledge Discovery vol. 1910 of the series Lecture Notes in Computer Science—4th European Conference, PKDD 2000 Lyon, France, Sep. 13-16, 2000 Proceedingspp. 277-288.*

Anonymous, Linear Search, Apr. 19, 2013, Wikipedia.

Extended European Search Report, from EP Application No. 14185379.6, Feb. 6, 2015, EP.

* cited by examiner

DATASET INTERSECTION DETERMINATION

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders to buy or sell contracts to an order book database maintained and managed by an exchange which contains data indicative of previously received, but unsatisfied, referred to as "resting", orders. A match engine is used by the exchange to, for a particular incoming order, search the order book database to identify a suitable counter order, e.g. for the same financial instrument and same or better price as the incoming order, with which to match the incoming order. Stated a different way, a dataset may involve previously received unsatisfied orders, or resting orders. An incoming order is received and the dataset of resting orders is searched for data that would match the incoming order to a resting order, or what may be known as intersecting data. For example a resting buy order and an incoming sell order may be of the same quantity or price of an underlier, and thus have matching or intersecting data. The process by which it is determined if one or more items of one dataset exist in a second dataset may be referred to as determining the intersection of two sets. Mathematically, the intersection of two sets A and B is the set of elements common to A and B.

Set intersection is a basic problem in computer science, and has a variety of applications. For example, Index-ANDing in database query evaluation calculates set intersection of property index tables. There are several established methods for computing set intersection, for example sort based methods, hash based methods, or search tree methods may be used.

In dataset intersection determination, items in a dataset may be compared. These comparisons involve transferring memory into different memory locations and levels. Because of these transfers, and the large amounts of data that may be involved in storing large datasets, numerous transfers may be required to determine all dataset intersections. For example, multiple data transfers may be required to search for an individual value of one item in a dataset, in another dataset. Therefore, if the datasets have thousands, or millions, of items, the determination of dataset intersection may be very computationally intensive.

Typically computers contain on-board RAM memory such as banks of SRAM and DRAM. Typically, the on-board memory forms a memory hierarchy, for instance where SRAM is smaller in capacity but faster to access, and DRAM is larger in capacity but has longer access times. This type of memory hierarchy may exist through multiple levels of storage, RAM and main computer memories. Also, each level of memory may have a minimum amount of memory required to be transferred between levels of memory in a memory transfer. In cache memory, this minimum amount of memory is known as a cache line or block. A cache line, or block, is generally fixed in size typically ranging from 16 to 256 bytes, but may be any size suitable for a particular hardware configuration or application.

DETAILED DESCRIPTION

Figure 1:
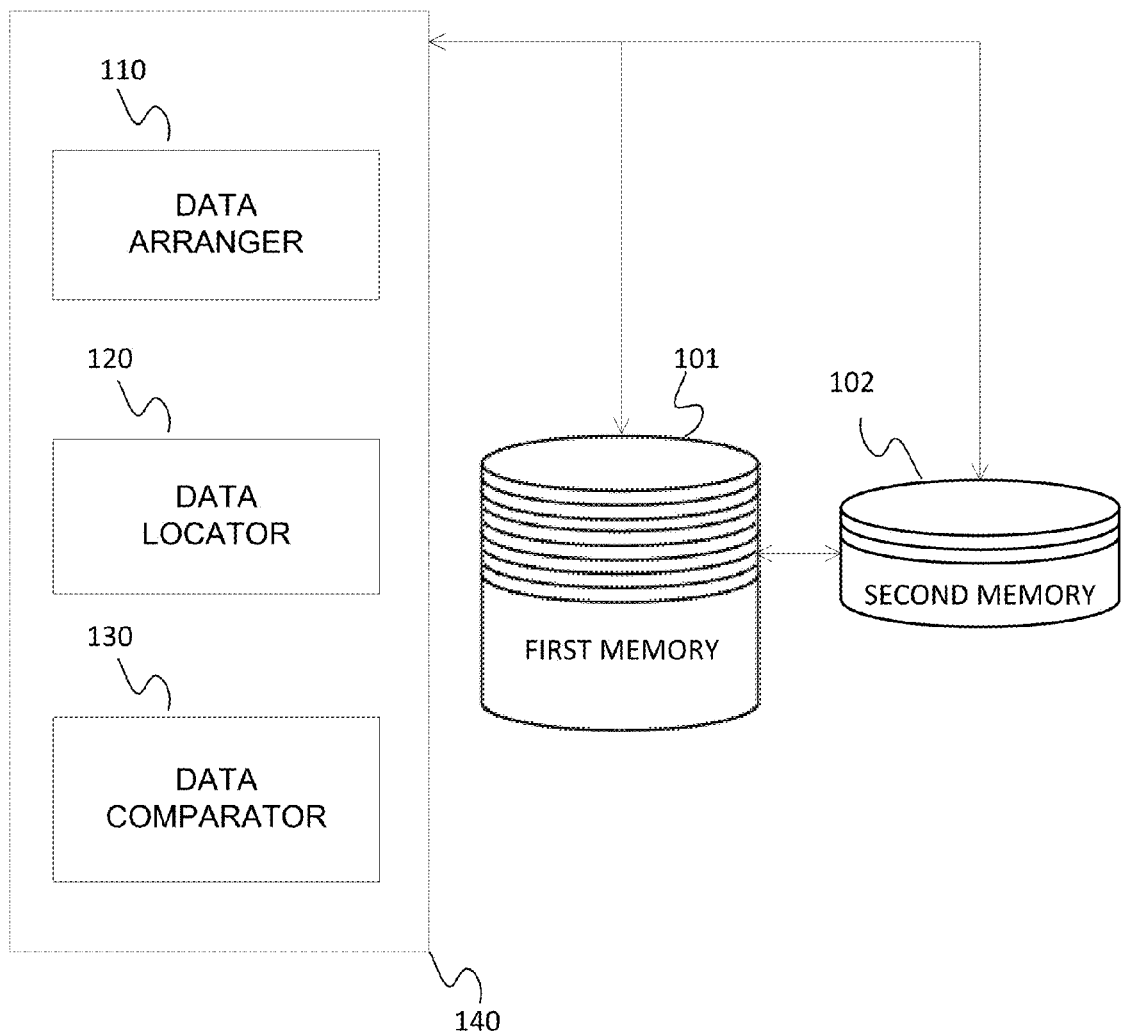
FIG. 1 depicts an illustrative system that may be used to implement aspects of the disclosed embodiments.

The disclosed embodiments relate to determining intersections between datasets. Particularly, an item in a first dataset may be determined to exist or not exist in a second dataset with one memory transaction.

To perform a comparison between items in datasets, memory containing the items being compared will need to be transferred between memory levels. A full cache line may be required to be transferred, even if the item being compared is stored using less memory than the established cache line size. Every memory transfer, or transaction, costs a system time and computing resources. Thus, every time items in datasets are compared, and no intersection is determined, more items and more data may need to be transferred to compare the entirety of the datasets. Therefore it is important that intersections are determined using a minimal amount of memory transactions to save computing resources, and find intersections in less time. Also, it is important that memory is used efficiently, such that items are stored in an efficient manner.

In an embodiment, the items in a first dataset, which may be stored in a memory, are arranged such that a number of items are grouped into subsets, each subset having a maximum size based on the minimum number of items that may be transferred between levels of memory in a singular transaction, such as cache miss/fetch/block transfer operation. The items are further grouped and organized such that each subset may have a unique group attribute. An item from a second dataset may share a group attribute with one, and only one, subset in the organized first dataset. That subset is then transferred between levels of memory and compared to the item from the second dataset to determine if the item exists in the subset. If the item from the second dataset does not exist in the subset, the item will not exist in the first dataset.

A dataset may be transformed from one organization to another. In an embodiment, items in a dataset are reorganized from any type of organization to an organization involving a grouping of items in a memory that is bounded by the minimum amount of data required to be transferred between levels of memory, such as a cache line for transfers to a cache memory. In an embodiment, a cache line for a particular configuration may be 128 bytes, and the dataset items may be 32 bit integers. Therefore, a maximum of 32 items may be in a subset or group.

A subset attribute may be assigned or determined for a group using any technique. For example, hashing, masking or sorting techniques may be used such that the attribute indicates the content of the subset, and that an item from a different dataset may belong in that subset. In hashing techniques, the content of an item is subjected to an algorithm to categorize the item. The categories may be the attribute of a particular arranged group. In masking techniques, multiple bits in a byte can be set either on, off or inverted from on to off (or vice versa) in a single bitwise operation to create a binary value used to represent, or associate with, an item or a set of items. The binary value may be the attribute of a particularly arranged group. In sorting techniques, all items of a certain range may exist in a subset. Sorting techniques are similar to guide words in a traditional dictionary. If an item exists in a dataset, it will exist in the range defined by specific boundary characteristics. These boundary characteristics may be a subset attribute. Any combination of techniques may be used as well.

FIG. 1 depicts an illustrative system 105 that may be used for dataset intersection determination. The system 105 includes a processor 140 including instructions 110, 120, 130 coupled with computer hardware capable to be configured to allow the execution of the instructions. The processor 140 may be a processor such as the processor 402 described in connection with the computer system 400 in FIG. 4. The processing hardware 140 is coupled with a first memory 101 and a second memory 102. In an embodiment, the first memory 101 and the second memory 102 may be considered a part of the processing hardware 140. In another embodiment, the first memory 101 and the second memory 102 may be considered separate from the processing hardware 140. The operations of processing hardware 140 shown in FIG. 1 may be controlled by computer-executable instructions stored on a non-transitory computer-readable medium 422.

The system 105 is configured for determining inclusion of a particular item in a dataset comprising a plurality of items, each of the particular item and the plurality of items being characterized by an item attribute, the plurality of items being characterized by a first arrangement and stored in a first memory 101 coupled with a second memory 102, the first memory 101 and second memory 102 being characterized by a minimum number of items which may be transferred from the first memory to the second memory by a single transfer operation.

The first memory 101 and second memory 102 may be any type of memory. The first memory 101 and second memory 102 may exist on different levels of a memory hierarchy. A memory hierarchy in computer storage distinguishes each level in the hierarchy by response time. The many trade-offs in designing for high performance will include the structure of the memory hierarchy, i.e. the size and technology of each component. So the various components will form a hierarchy of memories (m1, m2, . . . , mn) in which each member mi is in a sense subordinate to the next highest member mi−1 of the hierarchy. To limit waiting by higher levels, a lower level will respond by filling a buffer and then signaling to activate the transfer. The levels of the hierarchy subset one another. Typically, all data in one level is also found in the level below, and all data in that lower level is found in the one below it, and so on until the bottom of the hierarchy is reached. For example, the first memory 101 may be a disk memory and the second memory 102 may be a processor cache memory, or an intermediate cache memory located between a main memory and the processor.

Data transfers between the first memory 101 and the second memory 102 may be characterized by a minimum amount of data that may be transferred between the first memory 101 and the second memory 102 in what may be considered a single memory transfer or transaction. For example, first memory 101 may be a disk memory and the second memory 102 may be a processor cache memory, and the minimum amount of data that may be transferred between them may be 32 bytes, 64 bytes, 128 Bytes, or 256 bytes. Intervening components and devices may exist in the connection between the first memory 101 and the second memory 102, each of which may transfer or pass differing quantities of memory or data to complete a total memory transaction. As such, multiple sub-transactions may occur in the process of transferring data from the first memory 101 and the second memory 102, however, a singular transaction between first memory 101 and the second memory 102 will be defined as a singular initiation of a transfer of a quantity of data between the first memory 101 and the second memory 102.

The system 105 includes a data arranger 110, coupled with the first memory 101 and second memory 102. The data arranger 110 is configured to rearrange the plurality of items of the data set into a second arrangement different from the first arrangement, the second arrangement comprising a plurality of non-overlapping subsets of the plurality of items such that a number of items of the plurality of items included in each non-overlapping subset does not exceed the minimum number of items, wherein each of the plurality of non-overlapping subsets is characterized by a subset attribute based on the item attributes of the items of the plurality items included therein. In an embodiment, the data arranger 110 may be logic or computer executable code which receives a dataset and then processes the items of a dataset through an arrangement algorithm to create an arranged dataset.

The system 105 includes a data locator 120, coupled with the first memory 101 and second memory 102. The data locator 120 is configured to locate, based on the item attribute of the particular item and the subset attributes of each of the plurality of subsets, a subset of the plurality of subsets which would include the particular item if the particular item was one of the plurality of items. In an embodiment, the data locator 120 may be logic or computer executable code which locates a subset based on an item attribute and a corresponding attribute associated with the located subset.

The system 105 includes a data comparator 130, coupled with the first memory 101 and second memory 102. The data comparator 130 is configured to cause the transfer of the identified subset from the first memory 101 to the second memory 102, and evaluate the identified subset in the second memory 102 to determine whether the particular item is included therein, the particular item being determined to not exist in the plurality of items when the particular item is determined to not be included in the identified subset in the second memory. In an embodiment, the data comparator 130 may be logic or computer executable code which evaluates the identified subset to determine whether the particular item is included therein, the particular item being determined to not exist in the plurality of items when the particular item is determined to not be included in the identified subset.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
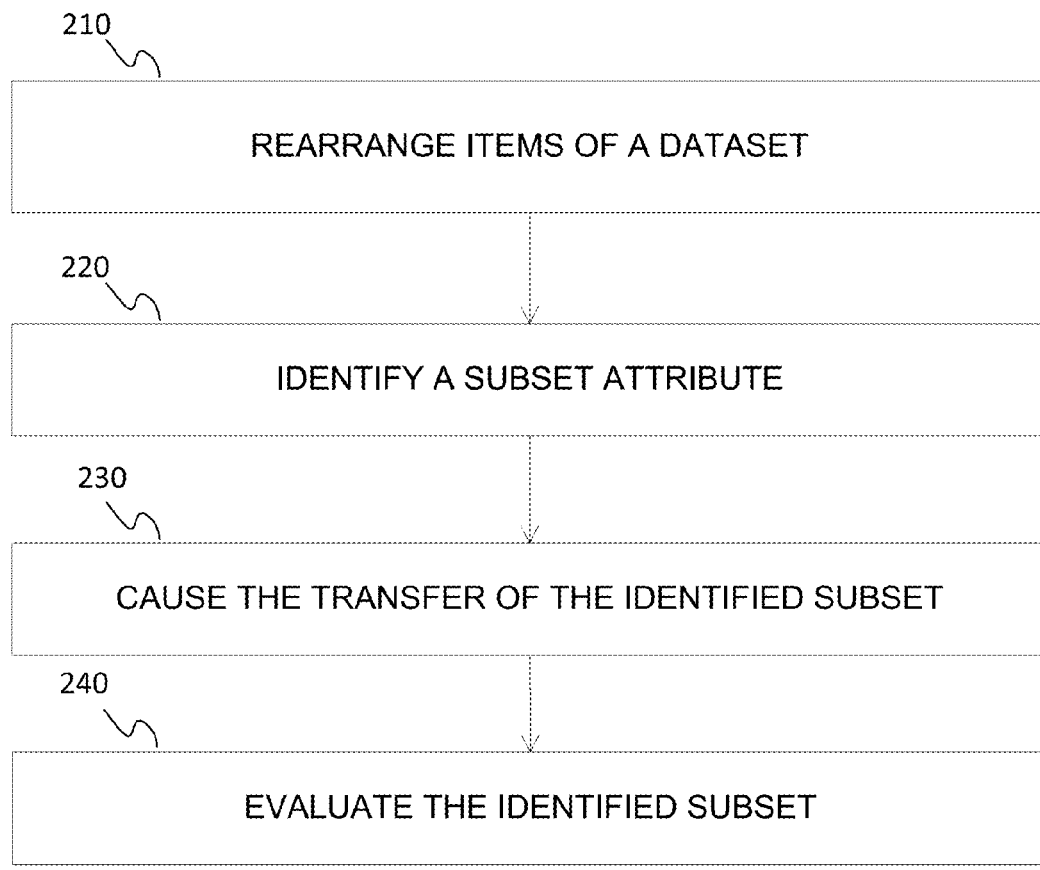
FIG. 2 depicts a flowchart for dataset intersection detection.

FIG. 2 depicts a flowchart for dataset intersection detection. The flowchart includes rearranging the items in a dataset into subsets of a certain size and having subset attributes (block 210), identifying a subset having a subset attribute (block 220), causing the transfer of the identified subset (block 230), and evaluating the identified subset for the inclusion of a particular item (block 240).

In an embodiment, the flowchart of FIG. 2 may be a computer implemented method of determining inclusion of a particular item in a dataset comprising a plurality of items, each of the particular item and the plurality of items being characterized by an item attribute, the plurality of items being characterized by a first arrangement and stored in a first memory coupled with a second memory, the first and second memories being characterized by a minimum number of items which may be transferred from the first memory to the second memory by a single transfer operation therebetween.

In an embodiment, the first memory is a computer main memory, the second memory is a processor cache memory, and the minimum number of items is determined as the minimum size of data which can be moved from the first memory to the second memory. In an embodiment, the minimum size of data is a cache line size for the second memory. In an embodiment the minimum number of items which may be transferred is determined by a minimum amount of data which can be moved from the first memory to the second memory, with the minimum amount of data being 32 bytes, 64 bytes, 128 bytes, or 256 bytes.

The method may involve rearranging (block 210) the plurality of items of the dataset into a second arrangement different from the first arrangement, the second arrangement comprising a plurality of non-overlapping subsets of the plurality of items such that a number of items of the plurality of items included in each non-overlapping subset does not exceed the minimum number of items, wherein each of the plurality of non-overlapping subsets is characterized by a subset attribute correlated with the item attributes of the items of the plurality items included therein. In an embodiment, the second arrangement may involve a hash table and an associated hash function. In another embodiment, the subset attribute may be an item value range, for example a range of integers from 100-150 may be included in a subset and the subset attribute may indicate as such. The value range may also involve a range of corresponding binary values for the content of the values in the subset. The particular item attribute may also be a value, and may also be a binary value for the content of the particular item. The second arrangement may be stored on the first memory.

In an embodiment, rearranging into the second arrangement comprises determining a fewest number of subsets required to store the plurality of items in the dataset based on the minimum number of items which may be transferred in a single transfer operation, and bounding the total number of subsets in the second dataset by the determined fewest number of subsets. For example, the dataset may have 3754 items that are each 32 bit integers. Also, the minimum number of items which may be transferred in a single transfer may be bound by a second memory cache line size of 256 bytes. Therefore, a minimum number of items that can be transferred, and consequently the maximum number of items in a subset, is 64. From this, it can be determined that the fewest possible number of subsets, as well as the bounded total number of subsets, in the second arrangement is 59.

The method may also involve identifying (block 220), based on the item attribute of the particular item and the subset attributes of each of the plurality of subsets, a subset of the plurality of subsets which would include the particular item if the particular item was one of the plurality of items. In an embodiment, identifying may involve the use of a hash function to correlate the particular item attribute with the subset attribute.

The method may also involve causing (block 230) the transfer of the identified subset from the first memory to the second memory. In an embodiment, a memory controller, or cache controller, may actually cause the transfer of the identified subset, and a processor may request the transfer. However, in other embodiments, a processor will be considered to cause the transfer with a request or directly.

The method may further involve evaluating (block 240) the identified subset in the second memory to determine whether the particular item is included therein, the particular item being determined to not exist in the plurality of items when the particular item is determined to not be included in the identified subset in the second memory. In an embodiment, evaluating the identified subset comprises a forward iteration method, a recursive method, a reverse order method, or a sentinel method.

In an embodiment, the identifying, causing, and evaluating are repeated for each of a plurality of items in a second dataset, and the method may further involve generating an intersect dataset of all items from the second data set that are determined to exist in the data set. In an embodiment, the particular item and the dataset are records indicative of buy or sell orders stored in an order book of a financial electronic market, and the intersect dataset may be a dataset involving matched orders.

In an embodiment, rearranging (block 210), or arranging, can take place well in advance of the other parts (block 220, block 230, block 240) of the indicated method, and need only be done once, the rest of the indicated method may be repeatedly performed to determine if multiple items exist in the dataset.

In an embodiment, an incoming order may be received and a dataset of resting orders is searched for data that would match or intersect the incoming order to a resting order. For example, items such as resting buy or sell orders of an orderbook may be arranged or rearranged (block 210) into a second arrangement different from a first arrangement, the second arrangement comprising a plurality of non-overlapping subsets of the resting order items such that a number of items of the plurality of items included in each non-overlapping subset does not exceed the minimum number of items, wherein each of the plurality of non-overlapping subsets is characterized by a subset attribute correlated with item attributes of the items of the plurality items included. An order may be received, and a subset may be identified (block 220) based on the item attribute of the particular item of the received order and the subset attributes of each of the plurality of subsets in the arranged orderbook, a subset of the plurality of subsets which would include the particular item of the received order if the particular item of the received order was one of the plurality of items in the order book. A transfer of the identified subset of the orderbook from a first memory to a second memory may be caused (block 230). The transferred subset of the orderbook may be evaluated (block 240) to determine if the particular item of the incoming order exists.

In an embodiment, archival market data and financial message data may be stored as an archived dataset in a networked configuration. The archived dataset may include historical prices, or historical values of other market parameters, of one or more of the products traded on the Exchange, data representative of past trading activities, such as past trade orders or other activities, of one or more market participants, or combinations thereof. The archived dataset may cover any period of time. The archived dataset may involve more than a billion individual records or data items stored on multiple servers. Another set of data involving a search dataset may include items that may be included in the archival market data. For example, a user may wish to review historical pricing data for a given product for a particular time period or a user may wish to review the trading activity of a particular market participant for a particular time period or with respect to a particular subset of the products traded on the Exchange. The search dataset may be arranged or rearranged (block 210) into an arrangement involving a number of non-overlapping subsets. The subsets of the arrangement will not exceed a minimum number of items of the search dataset. A particular subset of the arrangement may be identified (block 220) using a subset attribute which correlates to an attribute of an item in the archived dataset. The particular subset may be caused (block 230) to transfer between memories structured in a memory hierarchy of a server or workstation computer in communication with the server, where the particular subset may be evaluated (block 240) for the inclusion of the item in the archived dataset. In this way, the number of data or memory transactions required to determine the intersects between the search dataset and the archived dataset may be significantly reduced. For example, the total number of intersects may be determined with a number of data transactions equaling the number of items in the archived dataset. Further, the number of data transactions may be assured to be equal to the number of items in in the archived dataset.

Figure 3:
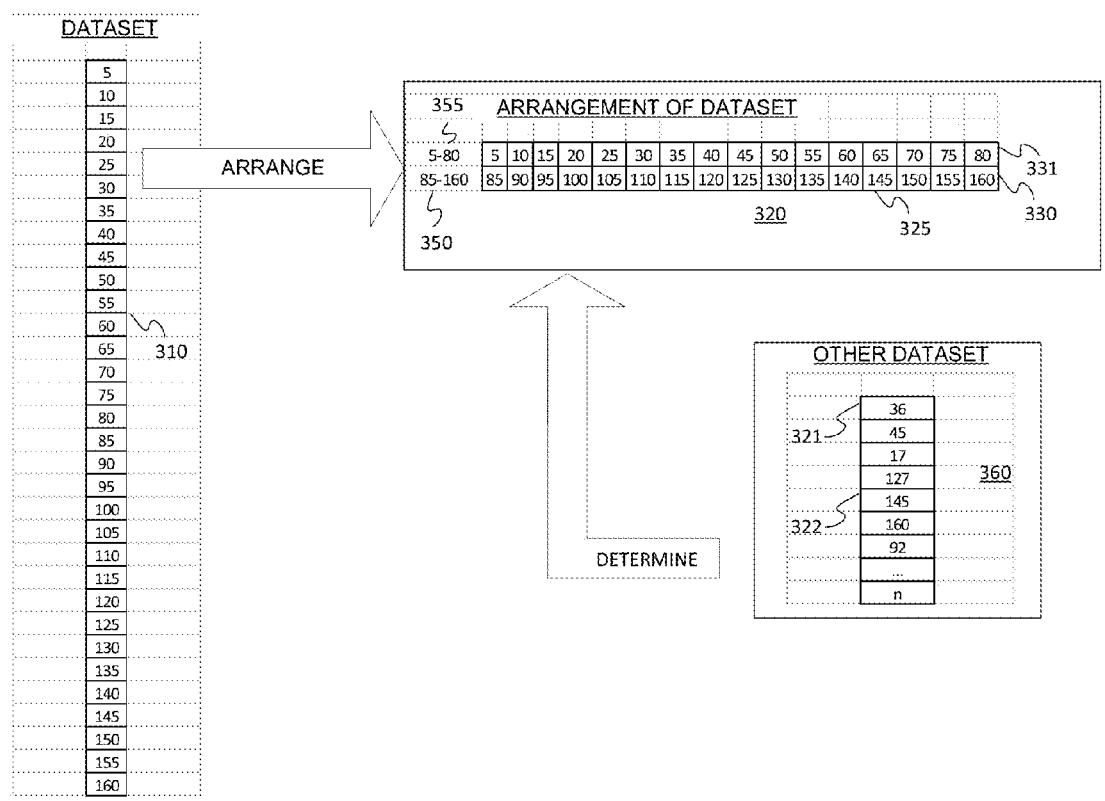
FIG. 3 depicts an illustrative example of dataset intersection determination.

FIG. 3 depicts an illustrative example of dataset intersection determination. In FIG. 3, a dataset 310 is arranged into a second dataset 320, having subsets 330, items 325, and subset attributes 350, 355. A particular item 321, 322 from another dataset 360 may be determined to exist or not exist in the second dataset 320.

In an embodiment, a dataset 310 is arranged into an arrangement 320 having a plurality of subsets 330 such that the amount of data of each subset does not exceed the minimum amount of data which can be moved from a first memory to a second memory. Each of the plurality subsets is characterized by a subset attribute based on item attributes of each of the items 325 included in a subset 330. The items 325 of the subsets 330 may be sorted based on a value or characteristic, and broken into subsets based on that sorted characteristic.

In an embodiment, each item 325 in an arrangement of a dataset 320 is a 32 bit integer. Also, the size of the subsets 330, 331 in the arranged dataset 320 may be bounded by a cache line size of 64 bytes. Therefore, the subsets 330, 331 will have a maximum of 16 items 325. Given a dataset that contains 32 items, an arrangement of the dataset 320 may have two subsets 330, 331. In such an embodiment, two subsets may be the maximum allowable number of subsets 330 331.

Each subset 330, 331 may also have an associated attribute 350, 355. In an embodiment, the associated subset attribute 350, 355 may identify a range of items 325 which are included in the subset 330, 331.

In an embodiment, a processor may be used to identify based on an item attribute of a particular item 321, 322 and the subset attributes of the arranged subsets 330, 331, a subset 330, 331 which would include the particular item 321, 322 if the particular item 321, 322 was included in the dataset 310. The processor may also be used to request the transfer of an identified subset 330, 331 from a first memory to a second memory. When the identified subset 330, 331 is on the second memory, the processor may evaluate the identified subset 330, 331 in the second memory to determine whether the particular item 322, 321 is included in the identified subset 330, 331. When the particular item 322, 321 does not exist in the identified subset 330, 331, the particular item 322, 321 is determined to not be included in the dataset 310.

In an embodiment, referring to FIG. 3, a particular value 322 in another dataset 360 may indicate an item attribute of a numerical value for the item 322, in this case 145. That value may be correlated to a subset attribute 350, in this case the range of 85-160. The correlated subset attribute 350 may then be used to identify the specific subset 330 that the particular item 322 would exist in, if the particular item 322 exists in the dataset 310. The identified subset 330 may then be transferred to a different level of memory that will facilitate the evaluation of the identified subset 330 for the existence of the particular item 322. The evaluation may then be performed by a processor using the different level of memory by any method. For example, a forward iteration method, a recursive method, a reverse order method, or a sentinel method may be used. Ultimately, in this embodiment, it would be determined that the particular item 322 did exist in the dataset 310 because the particular item 322 would be determined through the evaluation to exist in the identified subset 330. As can be seen from FIG. 3, particular a particular item 322 from the other dataset 360 does exist as an item 325 in the dataset 310.

However, another particular item 321, may be correlated to a different subset 331, and may be determined not to exist in the different subset 331 using the same method. When it is determined that that the other particular item 321 does not exist in the other subset 331, this indicates that the particular value 321 does not exist in the dataset 310. No other data transfers will need to be made to make this determination, as if the particular value 321 existed in the dataset 310, it would have existed in the subset 311 because of the design of the particular arrangement of the dataset 320.

Figure 4:
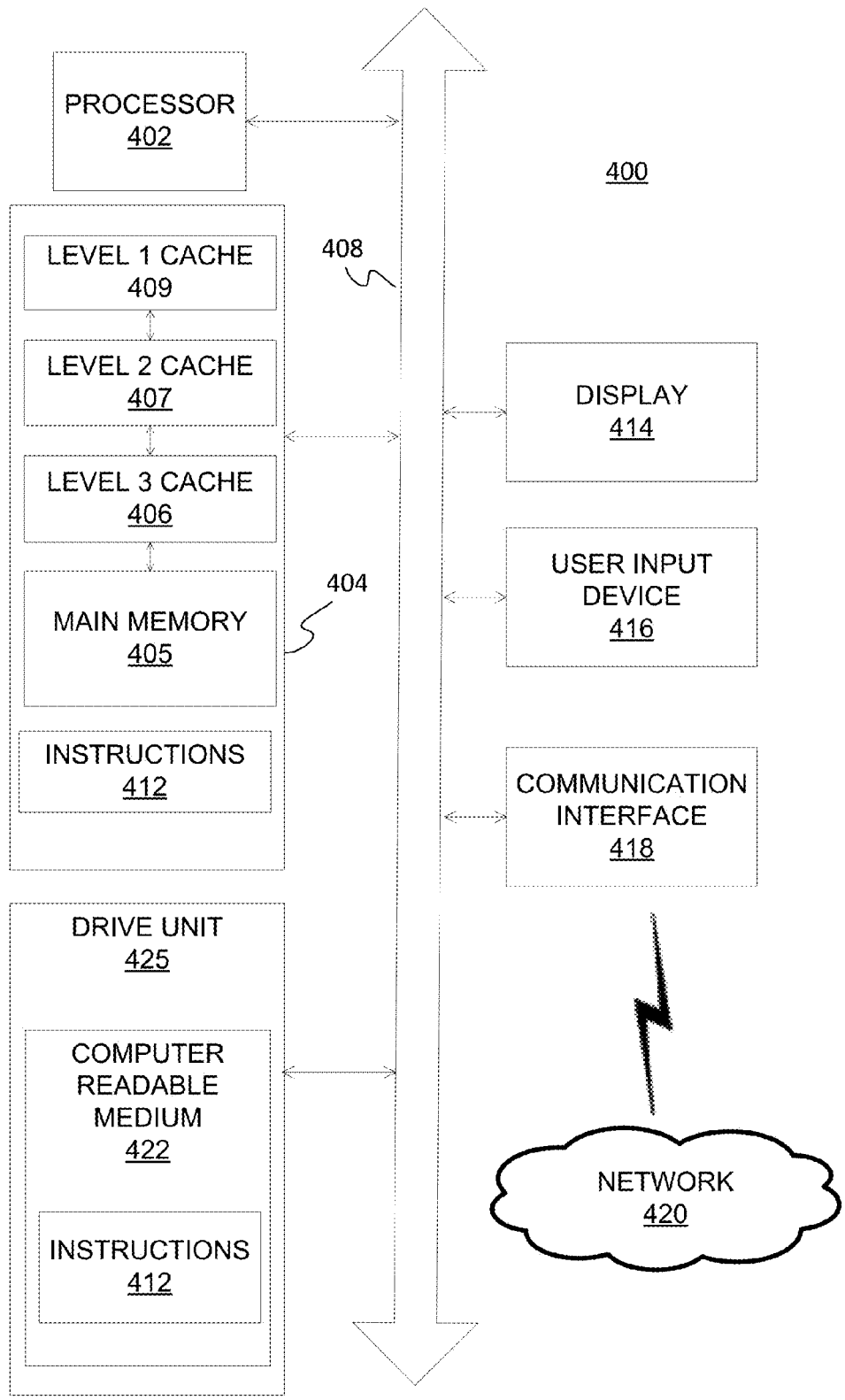
FIG. 4 shows an illustrative embodiment of a general computer system for dataset intersection detection

Referring to FIG. 4, an illustrative embodiment of a general computer system 400 for dataset intersection detection, or determination, is shown. The computer system 400 may include a processor 402 coupled with memory 404, in communication using a bus 408 with a display 415, a user input device 416, and a communication interface 418.

In an embodiment, the memory 404 may include multiple sets of memory. For example, memory 404 may include level 1 cache 409, level 2 cache 407, level 3 cache 406, and/or a main memory 405. The combination of memory sets in a memory 404 may include a first memory having a first size and a first access latency, wherein the first memory is configured to store a dataset and a second dataset. The memory 404 may also include a second memory coupled with the first memory and having a second size smaller than the first size and a second access latency smaller than the first access latency, the second memory further being characterized by a minimum amount of data which can be moved from the first memory to the second memory. The first and the second memory may be different memory levels. In an embodiment, the first memory may be a main memory 405, and the second memory may be a cache memory 406, 407, 409. In another embodiment, the first memory may be a level 2 cache 407 and the second memory may be a level 1 cache 409.

In an embodiment, the computer system 400 may be used in determining inclusion of a particular item in a dataset comprising a plurality of items, each of the particular item and the plurality of items being characterized by an item attribute, the plurality of items being characterized by a first arrangement. The processor 402 may be configured to rearrange the plurality of items of the dataset into a second arrangement different from the first arrangement, the second arrangement comprising a plurality of non-overlapping subsets of the plurality of items such that the amount of data of each non-overlapping subset does not exceed the minimum amount of data which can be moved from the first memory to the second memory, wherein each of the plurality of non-overlapping subsets is characterized by a subset attribute based on the item attributes of the items of the plurality items included therein. The processor 402 may also be configured to identify based on the item attribute of the particular item and the subset attributes of each of the plurality of subsets, a subset of the plurality of subsets which would include the particular item if the particular item was one of the plurality of items. The processor 402 may also be configured to request the transfer of the identified subset from a first memory 405 to a second memory 406. The processor 402 may also be configured to evaluate the identified subset in the second memory to determine whether the particular item is included therein, the particular item being determined to not exist in the plurality of items when the particular item is determined to not be included in the identified subset in the second memory 406.

The computer system 400 can include a set of instructions 412 that can be executed to cause the computer system 400 to perform any one or more of the methods or computer based functions disclosed herein. The computer system 400 may operate as a standalone device or may be connected, e.g., using a network 420, to other computer systems or peripheral devices. Any of the components discussed above, such as the data arranger 110, data locator 120, or data comparator 130, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 412 (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions 412 executable by the processor 402. The functions, acts or tasks illustrated in the figures or described herein may be performed by the programmed processor 402 executing instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 425. The disk drive unit 425 may include a computer-readable medium 422 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium 422 that includes instructions 412 or receives and executes instructions responsive to a propagated signal, so that a device connected to a network 420 by communication interface 418 can communicate voice, video, audio, images or any other data over the network 420. Further, the instructions may be transmitted or received over the network via the communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions 412 encoded on a computer readable medium 422 for execution by, or to control the operation of, data processing apparatus. While the computer-readable medium 422 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium 422 can be a random access memory or other volatile re-writable memory. Additionally, the computer-readable medium 422 can include a magneto-optical or optical medium 422, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium 422 or a distribution medium and other equivalents and successor media, in which data or instructions 412 may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of determining inclusion of a particular item in a dataset comprising a plurality of items, each of the particular item and the plurality of items being characterized by an item attribute, the plurality of items being characterized by a first arrangement and stored in a first memory coupled with a second memory, the first and second memories being characterized by a minimum number of items which may be transferred from the first memory to the second memory by a single transfer operation therebetween, the method comprising:

rearranging, by a processor coupled with the first and second memories, the plurality of items of the dataset into a second arrangement different from the first arrangement, the second arrangement comprising a plurality of non-overlapping subsets of the plurality of items such that a number of items of the plurality of items included in each non-overlapping subset does not exceed the minimum number of items, wherein each of the plurality of non-overlapping subsets is characterized by a subset attribute correlated with the item attributes of the items of the plurality items included therein;

identifying, by the processor, based on the item attribute of the particular item and the subset attributes of each of the plurality of subsets, a subset of the plurality of subsets which would include the particular item if the particular item was one of the plurality of items;

causing, by the processor, the transfer of the identified subset from the first memory to the second memory; and evaluating, by the processor, the identified subset in the second memory to determine whether the particular item is included therein, the particular item being determined to not exist in the plurality of items when the particular item is determined to not be included in the identified subset in the second memory.

2. The method of claim 1, wherein the second arrangement comprises a hash table and an associated hash function, and identifying a subset comprises using the hash function to correlate the particular item attribute with the subset attribute.

3. The method of claim 1, wherein the item attribute is a value representative of the item, and identifying the subset comprises correlating the value with a subset attribute value range.

4. The method of claim 1, wherein the first memory is a computer main memory, the second memory is a cache memory, and the minimum size of data which can be moved from the first memory to the second memory is a cache line size.

5. The method of claim 1, wherein the minimum number of items which may be transferred is determined by a minimum amount of data which can be moved from the first memory to the second memory.

6. The method of claim 1, wherein the plurality of items of the dataset comprise data indicative of orders to buy or sell financial instruments in a financial market.

7. The method of claim 1, the identifying, causing, and evaluating are repeated for each of a plurality of items in a target dataset, wherein the method further comprises generating an intersection dataset of all items from the target dataset that are determined to exist in the dataset.

8. The method of claim 1, wherein the rearranging into the second arrangement comprises determining a fewest number of subsets required to store the plurality of items in the dataset based on the minimum number of items which may be transferred in a single transfer operation, and bounding the total number of subsets in the second arrangement by the determined fewest number of subsets.

9. The method of claim 1, wherein evaluating the identified subset comprises a forward iteration method, a recursive method, a reverse order method, a sentinel method, or a combination thereof.

10. A system for determining inclusion of a particular item in a dataset comprising a plurality of items, each of the particular item and the plurality of items being characterized by an item attribute, the plurality of items being characterized by a first arrangement, the plurality of items being stored in a first memory having a first size and a first access latency, the first memory being coupled with a second memory having a second size smaller than the first size and a second access latency smaller than the first access latency, the second memory further being characterized by a minimum amount of data which can be moved from the first memory to the second memory, the system comprising:

computer executable program code stored in a third memory and executable by a processor to cause the processor to:

rearrange the plurality of items of the dataset into the second arrangement different from the first arrangement, a second arrangement comprising a plurality of non-overlapping subsets of the plurality of items such that the amount of data of each non-overlapping subset does not exceed the minimum amount of data which can be moved from the first memory to the second memory, wherein each of the plurality of non-overlapping subsets is characterized by a subset attribute based on the item attributes of the items of the plurality items included therein, identify based on the item attribute of the particular item and the subset attributes of each of the plurality of subsets, a subset of the plurality of subsets which would include the particular item if the particular item was one of the plurality of items, request the transfer of the identified subset from the first memory to the second memory; and evaluate the identified subset in the second memory to determine whether the particular item is included therein, the particular item being determined to not exist in the plurality of items when the particular item is determined to not be included in the identified subset in the second memory.

11. The system of claim 10, wherein the second arrangement comprises a hash table and an associated hash function, and identifying a subset comprises using the hash function to correlate the particular item attribute with the subset attribute.

12. The system of claim 10, wherein the item attribute is a value representative of the item, and identifying the subset comprises correlating the value with a subset attribute value range.

13. The system of claim 10, wherein the first memory is a computer main memory, the second memory is a cache memory, and the minimum size of data which can be moved from the first memory to the second memory is a cache line size.

14. The system of claim 13, wherein the cache line size being selected from the group consisting of 32 bytes, 64 bytes, 128 bytes, and 256 bytes.

15. The system of claim 10, wherein the plurality of items of the dataset comprise data indicative of orders to buy or sell financial instruments in a financial market.

16. The system of claim 10, wherein the processor is further configured to repeat the identifying, causing, and evaluating for each of a plurality of items in a target dataset, wherein the computer executable program code is executable by a processor to further cause the processor to generate an intersection dataset of all items from the target dataset that are determined to exist in the dataset.

17. The system of claim 10, wherein the processor is further configured determine a fewest number of subsets required to store the plurality of items in the dataset based on the minimum amount of data which may be transferred from the first memory to the second memory, and bounding the total number of subsets in the second arrangement by the determined fewest number of subsets.

18. The system of claim 10, wherein the processor is further configured to evaluate the identified subset using a forward iteration method, a recursive method, a reverse order method, or a sentinel method.

19. A system for determining inclusion of a particular item in a dataset comprising a plurality of items, each of the particular item and the plurality of items being characterized by an item attribute, the plurality of items being characterized by a first arrangement and stored in a first memory coupled with a second memory, the first and second memories being characterized by a minimum number of items which may be transferred from the first memory to the second memory by a single transfer operation therebetween, the system comprising:

a data arranger, coupled with the first and second memories, configured to rearrange the plurality of items of the data set into a second arrangement different from the first arrangement, the second arrangement comprising a plurality of non-overlapping subsets of the plurality of items such that a number of items of the plurality of items included in each non-overlapping subset does not exceed the minimum number of items, wherein each of the plurality of non-overlapping subsets is characterized by a subset attribute based on the item attributes of the items of the plurality items included therein;

a data locator, coupled with the first and second memories, configured to locate based on the item attribute of the particular item and the subset attributes of each of the plurality of subsets, a subset of the plurality of subsets which would include the particular item if the particular item was one of the plurality of items; and a data comparator, coupled with the first and second memories, configured to cause the transfer of the identified subset from the first memory to the second memory, and evaluate the identified subset in the second memory to determine whether the particular item is included therein, the particular item being determined to not exist in the plurality of items when the particular item is determined to not be included in the identified subset in the second memory.

20. The system of claim 19, wherein the first memory is a computer main memory, the second memory is a cache memory, the minimum size of data which can be moved from the first memory to the second memory is a cache line size, and the minimum number of items which may be transferred is the maximum number of items which can be stored in the cache line size.

21. A system for determining inclusion of a particular item in a dataset comprising a plurality of items, each of the particular item and the plurality of items being characterized by an item attribute, the plurality of items being characterized by a first arrangement and stored in a first memory coupled with a second memory, the first and second memories being characterized by a minimum number of items which may be transferred from the first memory to the second memory by a single transfer operation therebetween, the system comprising:

means for rearranging the plurality of items of the dataset into a second arrangement different from the first arrangement, the second arrangement comprising a plurality of non-overlapping subsets of the plurality of items such that a number of items of the plurality of items included in each non-overlapping subset does not exceed the minimum number of items, wherein each of the plurality of non-overlapping subsets is characterized by a subset attribute correlated with the item attributes of the items of the plurality items included therein;

means for identifying based on the item attribute of the particular item and the subset attributes of each of the plurality of subsets, a subset of the plurality of subsets which would include the particular item if the particular item was one of the plurality of items;

means for causing the transfer of the identified subset from the first memory to the second memory; and means for evaluating the identified subset in the second memory to determine whether the particular item is included therein, the particular item being determined to not exist in the plurality of items when the particular item is determined to not be included in the identified subset in the second memory.

\* \* \* \* \*